(12) United States Patent
Matsumoto et al.

(10) Patent No.: US 12,070,819 B2
(45) Date of Patent: Aug. 27, 2024

(54) SYSTEMS AND METHODS FOR DRILLING VIAS IN TRANSPARENT MATERIALS

(71) Applicant: ELECTRO SCIENTIFIC INDUSTRIES, INC., Portland, OR (US)

(72) Inventors: Hisashi Matsumoto, Portland, OR (US); Jan Kleinert, Portland, OR (US); Zhibin Lin, Portland, OR (US)

(73) Assignee: ELECTRO SCIENTIFIC INDUSTRIES, INC., Beaverton, OR (US)

( * ) Notice: Subject to any disclaimer, the term of this patent is extended or adjusted under 35 U.S.C. 154(b) by 434 days.

(21) Appl. No.: 17/272,155

(22) PCT Filed: Oct. 2, 2019

(86) PCT No.: PCT/US2019/054271
§ 371 (c)(1),
(2) Date: Feb. 26, 2021

(87) PCT Pub. No.: WO2020/076583
PCT Pub. Date: Apr. 16, 2020

(65) Prior Publication Data
US 2021/0245303 A1 Aug. 12, 2021

(51) Int. Cl.
*B23K 26/382* (2014.01)
*B23K 26/0622* (2014.01)
(Continued)

(52) U.S. Cl.
CPC ........ *B23K 26/382* (2015.10); *B23K 26/0624* (2015.10); *B23K 26/402* (2013.01); *B23K 2103/50* (2018.08)

(58) Field of Classification Search
CPC ............ B23K 2103/50; B23K 26/0624; B23K 26/382; B23K 26/402; B23K 26/40;
(Continued)

(56) References Cited

U.S. PATENT DOCUMENTS

| 4,473,737 A | 9/1984 | Anthony |
| 4,664,940 A | 5/1987 | Bensoussan et al. |

(Continued)

FOREIGN PATENT DOCUMENTS

| CN | 107662055 A | 2/2018 |
| CN | 108161250 A | 6/2018 |

(Continued)

OTHER PUBLICATIONS

Office Action for Chinese counterpart application No. 201980060712.3 mailed Sep. 23, 2022 (8 pages).
(Continued)

*Primary Examiner* — Dana Ross
*Assistant Examiner* — Adam M Eckardt
(74) *Attorney, Agent, or Firm* — Edward Scott Trask (57) ABSTRACT

A method for forming a through-via in a substrate having opposing first and second surfaces can include directing a focused beam of laser pulses into the substrate through the first surface of the substrate and, subsequently, through the second surface of the substrate. The focused beam of laser pulses can have a wavelength to which the substrate is at least substantially transparent and a beam waist of the focused beam of laser pulses is closer to the second surface than to the first surface. The focused beam of laser pulses is characterized by a pulse repetition rate, a peak optical intensity at the substrate and an average power at the substrate sufficient to: melt a region of the substrate near the second surface, thereby creating a melt zone within the substrate; propagate the melt zone toward the first surface;
(Continued)

and vaporize or boil material of the substrate and located within the melt zone.

19 Claims, 5 Drawing Sheets

(51) Int. Cl.
  *B23K 26/402* (2014.01)
  *B23K 103/00* (2006.01)
(58) Field of Classification Search
  CPC .... B23K 26/0622; B23K 26/38; B23K 26/57; C03B 33/09; B28D 5/00; C03C 23/00
  See application file for complete search history.

(56) References Cited

U.S. PATENT DOCUMENTS

| | | | |
|---|---|---|---|
| 5,293,025 A | | 3/1994 | Wang |
| 6,417,485 B1* | | 7/2002 | Troitski .............. B23K 26/0608 219/121.69 |
| 9,517,963 B2 | | 12/2016 | Marjanovic et al. |
| 2007/0272668 A1* | | 11/2007 | Albelo ................. B23K 26/386 219/121.72 |
| 2007/0272669 A1 | | 11/2007 | Comley et al. |
| 2008/0108229 A1 | | 5/2008 | Tanaka et al. |
| 2010/0025387 A1 | | 2/2010 | Arai et al. |
| 2010/0084384 A1* | | 4/2010 | Bovatsek ............. B29C 66/836 219/121.64 |
| 2011/0304023 A1 | | 12/2011 | Schmidt et al. |
| 2012/0145331 A1 | | 6/2012 | Gomez et al. |
| 2014/0083986 A1 | | 3/2014 | Zhang et al. |
| 2014/0147623 A1 | | 5/2014 | Shorey et al. |
| 2015/0034613 A1 | | 2/2015 | Hosseini |
| 2015/0121960 A1 | | 5/2015 | Hosseini |
| 2015/0140735 A1 | | 5/2015 | Hosseini |
| 2015/0165560 A1* | | 6/2015 | Hackert .............. C03B 33/0222 428/131 |
| 2015/0166396 A1* | | 6/2015 | Marjanovic ............. B32B 17/10 428/137 |
| 2015/0246415 A1 | | 9/2015 | Hosseini |
| 2016/0368086 A1 | | 12/2016 | Lott et al. |
| 2017/0326688 A1 | | 11/2017 | Turner et al. |
| 2018/0068868 A1 | | 3/2018 | Jaramillo et al. |

FOREIGN PATENT DOCUMENTS

| | | |
|---|---|---|
| EP | 2876078 A2 | 5/2015 |
| TW | 201536462 A | 10/2015 |
| WO | 2015100056 A1 | 7/2015 |

OTHER PUBLICATIONS

Search Report for Chinese counterpart application No. 201980060712.3 mailed Sep. 23, 2022 (3 pages).
Written Opinion for Singapore counterpart application No. 11202101843S mailed Oct. 12, 2022 (10 pages).
Hidai, H., Yoshioka, M., Hiromatsu, K. et al. "Glass modification by continuous-wave laser backside irradiation" (CW-LBI). Appl. Phys. A 96, 869-872 (2009).
Search Report for European counterpart application No. 19870433.0 mailed May 20, 2022.
Office Action and Search Report for Taiwanese counterpart application No. 108135498 dated Dec. 9, 2022 (12 pages).
Collaborative Search and Examination report for Chinese counterpart application No. 201980060712.3 dated Jan. 10, 2020 (11 pages).
Collaborative Search and Examination report for Japanese counterpart application No. 2021-518967 dated Jan. 8, 2020 (10 pages).
Collaborative Search and Examination report for PCT counterpart application No. 19870433.0 dated Jan. 15, 2020 (11 pages).
PCT/US2019/054271, international search report issued Feb. 12, 2020, 2 pages.
PCT/US2019/054271, written opinion, 8 pages.
Leonid B. Glebov, "Optical Absorption and Ionization of Silicate Glasses", Laser-Induced Damage in Optical Materials, 2000, SPIE vol. 4347, p. 343-358.
Mingying Sun et al., "Role of thermal Ionization in Internal Modification of Bulk Borosilicate Glass with Picosecond Laser Pulses at High Repetition Rates", National Laboratory on High Power Laser and Physics, Shanghai Institute of Optics and Fine Mechanics, Chinese Academy of Sciences, Oct. 1, 2013 vol. 3 No. 10, 11 pages.
Isamu Miyamoto et al., "Nonlinear Absorption Dynamics Simulated in Internal Modification of Glass at 532nm and 1064nm by Ultrashort Laser Pulses", 10th CIRP Conference of Photonic Technologies, 2018, 5 pages.
Karimelahi, Samira, Ladan Abolghasemi, and Peter R. Herman. "Rapid micromachining of high aspect ratio holes in fused silica glass by high repetition rate picosecond laser." Applied Physics A 114.1 (2014): 91-111.
Bhuyan, M. K., et al. "Single-shot high aspect ratio bulk nanostructuring of fused silica using chirp-controlled ultrafast laser Bessel beams." Applied Physics Letters 104.2 (2014): 021107.
Search Report for Taiwanese counterpart application No. 112133781 completed on Nov. 6, 2023. (2 pages).

\* cited by examiner

SYSTEMS AND METHODS FOR DRILLING VIAS IN TRANSPARENT MATERIALS

CROSS-REFERENCE TO RELATED APPLICATIONS

This application claims the benefit of U.S. Provisional Application No. 62/742,694, filed Oct. 8, 2018, which is incorporated by reference in its entirety.

BACKGROUND

I. Technical Field

Embodiments of the present invention relate generally to processing of substrates and, more particularly, to laser-drilling vias such as through-vias in a substrate.

II. Discussion of the Related Art

There is intense interest in thin glass with precision-formed holes for electronics applications. The holes are filled with a conducting material, and are used to conduct electrical signals from one part to another, allowing precision connection of central processing units, memory chips, graphical processing units, or other electronic components. For such applications, substrates with metalized holes in them are typically called "interposers." As compared to presently used interposer materials such as fiber reinforced polymer or silicon, glass has a number of advantageous properties. Glass can be formed thin and smooth in large sheets without the need for polishing, it has higher stiffness and greater dimensional stability than organic alternatives, it is a much better electrical insulator than silicon, it has better dimensional (thermal and rigidity) stability than organic options, and it can be tailored to different coefficients of thermal expansion to control stack warp in integrated circuits.

A variety of hole formation methods can be used to create holes in glass, such as hot pressing, lithography of photo-machinable glass, electric-discharge drilling, powder blasting, and a wide variety of laser drilling processes. With any of the techniques, the challenge is generally around forming a hole of sufficient quality (low cracking, appropriate size or roundness) at a high enough via-formation rate (holes/sec) which ultimately affects cost. For example, hot pressing of glass has difficulty forming holes of small enough dimensions (less than or equal to about 100 microns), electrical discharge drilling can be difficult to do with a tight hole pitch (i.e., a hole to hole distance of less than about 50 microns), laser drilling of holes using beam trepanning can be slow (e.g., about 1 hole/sec), and excimer laser processing and photomachinable glass can have large initial capital costs.

Conventional laser drilling processes have been developed that make particularly high quality holes. For example, a UV nanosecond laser can be used in a percussion drilling process to make pilot holes (each about 10 microns in diameter) in a glass part using multiple (e.g., hundreds) of laser pulses per hole. The part is then etched with acid to enlarge the pilot holes and achieve the target dimensions. The etched holes are subsequently metalized, redistribution layers are added to fan out electrical signals, and the parts are diced into smaller pieces to create functional interposers. However, laser drilling with UV nanosecond lasers can be a time consuming process, and with percussion drilling (i.e., one pulse after another at the same location), it can take hundreds of pulses to drill an individual hole to the desired depth. As the capital cost of a precision laser drilling platform can be significant (approaching $1M/machine), speed of hole formation is a key parameter in overall interposer production cost. Also, etching the glass part makes it difficult to ensure that different glass parts, once etched, have substantially the same thickness.

Another conventional laser drilling process involves a single-shot laser process in which a single laser pulse having a Bessel beam profile is used to modify the glass part wherever a via is desired, and the part is then etched with acid form the vias. While this process can be used to produce up to 5000 vias per second (200 us per via), the process still requires etching which, as discussed above, can make it difficult to ensure uniform thickness of the glass parts in the finished product. Further, laser pulses having Bessel beam profiles are difficult to rapidly deflect using conventional beam-steering technologies (e.g., galvanometer mirrors, etc.). Accordingly, the time required to form a relatively sparse pattern of vias is typically much slower than 5000 vias per second.

In Karimelahi, Samira, Ladan Abolghasemi, and Peter R. Herman. "Rapid micromachining of high aspect ratio holes in fused silica glass by high repetition rate picosecond laser." Applied Physics A 114.1 (2014): 91-111, a rigorous study demonstrated that IR and green ultrafast lasers and Gaussian focal spots could be used to create high aspect ratio vias in glass, but the vias were of inferior quality or required a subsequent etching step. Therefore, there is a need for a method of laser drilling a material, such as glass, that minimizes or eliminates the above mentioned problems.

SUMMARY

One embodiment can be characterized as an article that includes a substrate having a plurality of laser-drilled through-holes continuously extending from a first surface of the substrate to a second surface of the substrate, opposite the first surface of the substrate, wherein: the plurality of laser-drilled through-holes have a diameter of 10 $\mu$m or greater; a spacing between adjacent etched through-holes of 30 $\mu$m or greater; the plurality of laser-drilled through-holes comprise an opening in the first surface, an opening in the second surface, and a waist located between the opening in the first surface and the opening in the second surface; a diameter of the waist is at least 75% of the diameter of the opening in the first surface or the opening in the second surface; and a difference between a diameter of the opening in the first surface and a diameter of the opening in the second surface is 3.5 $\mu$m or less.

Another embodiment can be characterized as a method for forming a through-via in a substrate, wherein the method includes: providing a substrate having a first surface and a second surface opposite the first surface; and directing, during a drilling period less having a duration less than 100 µs, a focused beam of laser pulses into the substrate at a location through the first surface of the substrate and, subsequently, through the second surface of the substrate, wherein the focused beam of laser pulses has a wavelength to which the substrate is at least substantially transparent, wherein an optical intensity of the focused beam of laser pulses at the substrate is less than an optical breakdown intensity of the substrate, wherein the focused beam of laser pulses has a Gaussian energy distribution, wherein the focused beam of laser pulses has a pulse repetition rate greater than 5 MHz, and wherein laser pulses within the focused beam of laser pulses have a pulse width greater than 200 fs.

Another embodiment can be characterized as a method for forming a through-via in a substrate, wherein the method includes: providing a substrate having a thickness in a range from 30 µm to 150 µm and having a first surface and a second surface opposite the first surface; and directing a focused beam of laser pulses into the substrate through the first surface of the substrate and, subsequently, through the second surface of the substrate, wherein the focused beam of laser pulses has a wavelength to which the substrate is at least substantially transparent; wherein an optical intensity of the focused beam of laser pulses at the substrate is less than an optical breakdown intensity of the substrate; wherein the focused beam of laser pulses has a Gaussian energy distribution; wherein the focused beam of laser pulses has a pulse repetition rate, a peak optical intensity at the substrate and an average power at the substrate driving a cumulative heating effect; and wherein laser pulses within the focused beam of laser pulses have a pulse width, wherein the peak optical intensity, pulse repetition rate, average power and pulse width are selected such that the through-via is formed in less than 40 µs.

Yet another embodiment can be characterized as a method for forming a through-via in a substrate, wherein the method includes: providing a substrate having a first surface and a second surface opposite the first surface; and directing a focused beam of laser pulses into the substrate through the first surface of the substrate and, subsequently, through the second surface of the substrate, wherein the focused beam of laser pulses has a wavelength to which the substrate is at least substantially transparent and wherein a beam waist of the focused beam of laser pulses is closer to the second surface of the substrate than to the first surface of the substrate, and wherein the focused beam of laser pulses is characterized by a pulse repetition rate, a peak optical intensity at the substrate and an average power at the substrate sufficient to: melt a region of the substrate near the second surface, thereby creating a melt zone within the substrate; propagate the melt zone toward the first surface; and vaporize or boil material of the substrate and located within the melt zone.

DETAILED DESCRIPTION

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," "approximately." etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper." and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

Figure 9:
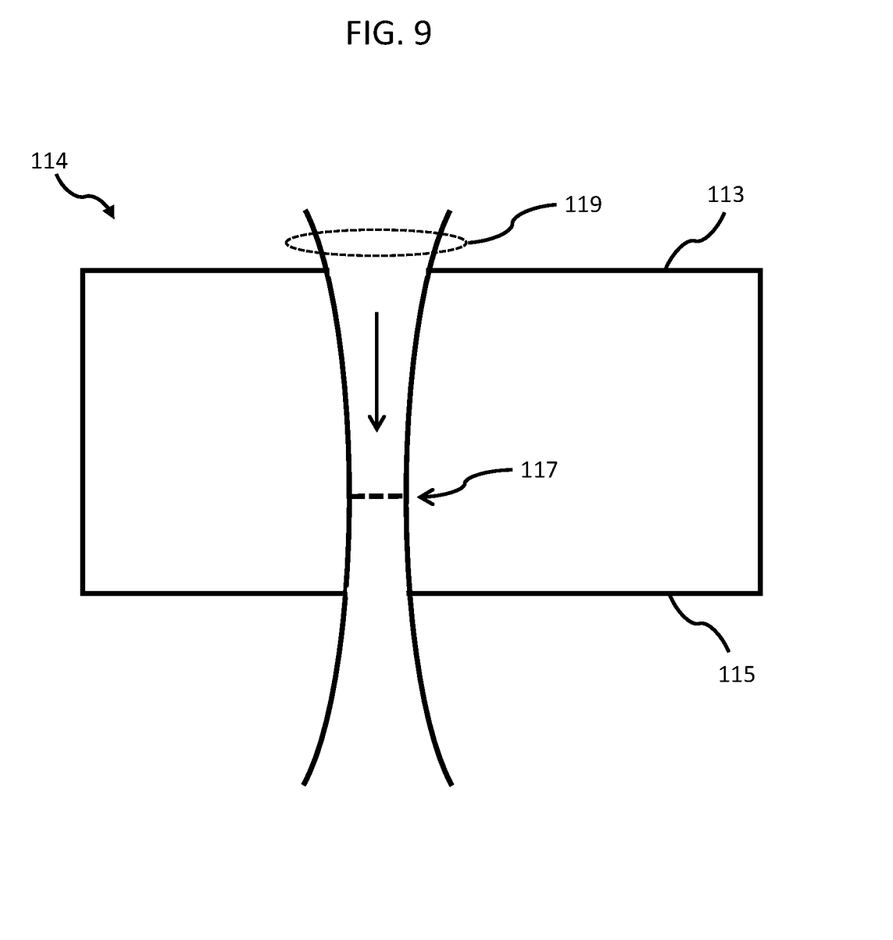
FIG. 9 illustrates a cross-section of a glass substrate showing the location of a beam waist of a beam of laser pulses relative to the first and second surfaces of a substrate.

In the embodiment discussed herein, as shown in FIG. 9, a laser drilling process for drilling a through-via in a substrate 114 includes directing a beam of laser pulses 119 into the substrate 114 such that the beam of laser pulses 119 is transmitted into the substrate 114 through a first surface 113 of the substrate 114 and propagates within the substrate 114 towards a second surface 115 of the substrate 114 that is opposite the first surface 113. Generally, the beam of laser pulses 119 is focused to produce a beam waist 117 that is located at or near the second surface 115 (i.e., inside or outside the substrate 114).

In some embodiments, the substrate is provided as an article of glass (e.g., borosilicate glass, aluminoborosilicate glass, aluminosilicate glass, alkali-lead silicate glass, alkali alkaline earth silicate glass, germanium oxide glass, fused silica, etc.), synthetic quartz, a glass ceramic (e.g., lithium-aluminum-silicate), a ceramic, sapphire, a semiconductor material (e.g., Si, SiGe, GaAs, GaN, SiC, etc.), or the like or any combination thereof. The article may thus be provided as a glass interposer, a silicon interposer, a semiconductor wafer, a semiconductor die, a substrate (e.g., for a display screen, for wafer level packaging or other semiconductor packaging, for display panel level packaging, for a MEMS or sensor device, etc.) or the like or any combination thereof. In some embodiments, the substrate is provided as an article (e.g., having a thickness in a range from 30 μm (or thereabout) to 150 μm (or thereabout)). However, it should be appreciated that, depending upon the particular article embodied by the substrate, the thickness of the substrate can be less than 30 μm or greater than 150 μm.

Generally, the beam of laser pulses directed to the substrate has a wavelength to which substrate is substantially transparent. As used herein, the substrate can be considered "substantially transparent" to the wavelength of the beam of laser pulses when absorption of the beam of laser pulses by the substrate is less than about 20% (e.g., less than about 15%, less than about 10%, less than about 5%, less than about 1%) per mm of material depth at this wavelength. Accordingly, depending upon the material from which the substrate is formed, the beam of laser pulses may have a wavelength in the ultraviolet, visible or infrared regions of the electromagnetic spectrum. For example, in some embodiments, if the substrate is provided as an article of glass, quartz, or sapphire, then the beam of laser pulses may have a wavelength in a range from 300 nm (or thereabout) to 1064 nm (or thereabout).

As will be discussed in greater detail below, the laser drilling process can be characterized by parameters including pulse wavelength, pulse width, pulse energy, pulse repetition rate, peak optical intensity at the substrate, drilling period (i.e., the period of time during which laser pulses are directed to a particular location at the substrate to form a through-via), and average power of the beam of laser pulses at the substrate. Generally, the beam of laser pulses ultimately directed to the substrate during the laser drilling process has a Gaussian energy profile. Use of a beam of laser pulses having a Gaussian energy profile allows the beam of laser pulses to be rapidly deflected using conventional beam-steering technologies (e.g., galvanometer mirrors, fast-steering mirrors, rotating polygon mirrors, acousto-optical deflectors, electro-optical deflectors, etc.) to form through-vias in the substrate. Depending upon the desired diameter of a via, percussion drilling can be employed (e.g., to form a via having a diameter in a range from 1 μm to 100 μm, e.g., 10 μm, 20 μm, 30 μm, 50 μm, etc.) or the beam can be deflected (e.g., as described above) to form vias having a similar or larger diameters. Since the beam can be rapidly deflected, it is also possible to form even a relatively sparse pattern of through-vias at a higher throughput than with conventional laser drilling processes. Lastly, the laser drilling process described herein does not require an acid etch process to obtain through-vias with acceptable diameters or surface morphologies.

The laser drilling process can also be characterized by a parameter referred to herein as a "z range." The z range is the range of distances between the second surface of the substrate and the beam waist of the beam of laser pulses that, during the laser drilling process is performed, produce a through-via in the substrate. The z range has been discovered by the inventors to be dependent upon at least some of the other aforementioned parameters of the laser drilling process. For example, at a given pulse wavelength, pulse width and pulse repetition rate, and above a threshold drilling period and average power at the substrate, the z range has been discovered to vary depending upon the drilling period and average power at the substrate during the laser drilling process. Identifying values for laser drilling process parameters (e.g., drilling period and average power at the substrate, for a given pulse wavelength, pulse width and pulse repetition rate) that yield a sufficiently large z range is significant because the substrate is typically not of perfectly uniform thickness (i.e., there may be thickness variability on the order of about 10 μm or more) and/or not perfectly flat when the laser drilling process is performed (i.e., there may be some waviness in the substrate, on the order of about 10 μm or more), and the thickness of one substrate may vary from the thickness of another substrate. Thus if the z range does not accommodate for variations in substrate thickness or flatness, then the laser drilling process will not reliably form through-vias.

Once drilled, the through-vias may be coated and/or filled with an electrically conductive material, or the like. For example, through-vias may be formed in a substrate such as a glass interposer and coated and/or filled with an electrically conductive material (e.g., copper, aluminum, gold, silver, lead, tin, indium tin oxide, or the like or any combination or alloy thereof). The process used to metallize the interior of the through-vias can be, for example, electroplating, electroless plating, physical vapor deposition, or other evaporative coating methods. The through-vias may also be coated with catalytic materials, such as platinum, palladium, titanium dioxide, or other materials that facilitate chemical reactions within the holes. Alternatively, the through-vias may be coated with other chemical functionalization, so as to change surface wetting properties or allow attachment of biomolecules, and used for biochemical analysis. Such chemical functionalization could be silanization of the glass surface of the through-vias, and/or additional attachment of specific proteins, antibodies, or other biologically specific molecules, designed to promote attachment of biomolecules for desired applications.

Generally, the beam of laser pulses can be characterized by parameters such as pulse repetition rate, pulse energy and pulse width. The pulse energy and pulse width are selected such that, when the beam of laser pulses is focused, the beam waist is spaced apart from the second surface of the substrate by the offset distance, each laser pulse in the focused beam of laser pulses irradiates a region of the substrate (i.e., corresponding to the spot size of the laser pulse at the region of the substrate) at a peak optical intensity that is less than an optical breakdown intensity of the substrate. Moreover, the pulse repetition rate of the beam of laser pulses is selected (e.g., in consideration of the peak optical intensity at which the region of the substrate is irradiated by each laser pulse) to be sufficiently high such that the irradiated region of the substrate can accumulate heat over an initial period of time (e.g., also referred to herein as an "incubation period"). The heating of the substrate during the incubation period initiates mainly due to multi-photon absorption by the substrate material. Absorption of laser pulses during the incubation period may also occur at point defects in the substrate that could create the defect states residing between the conduction band and the valence band for optical absorption.

Figure 1:
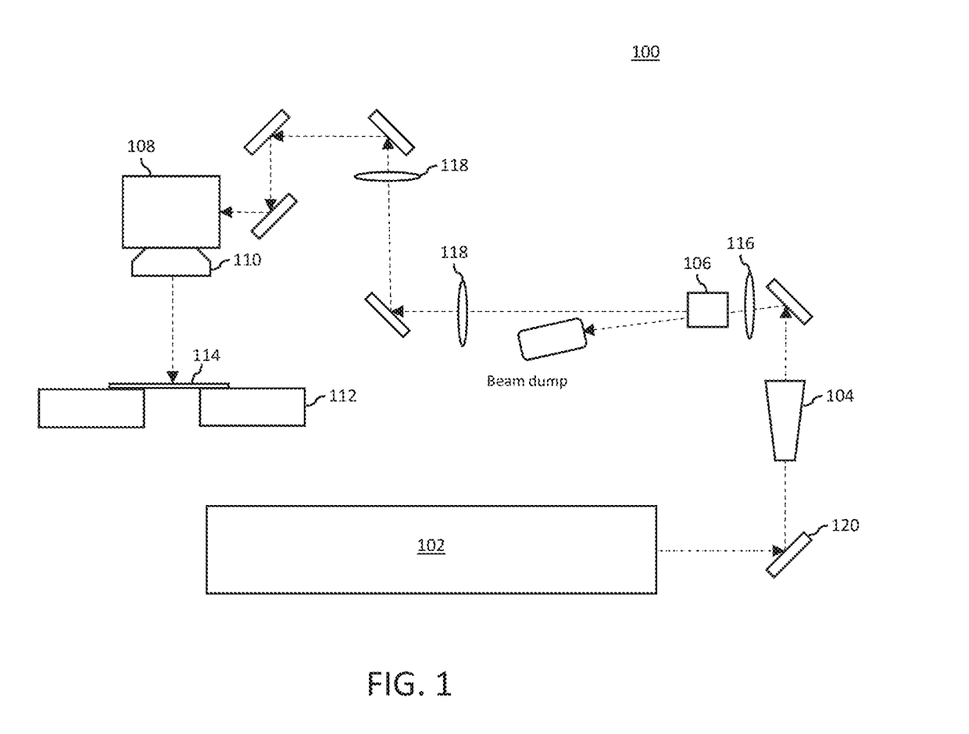
FIG. 1 illustrates an exemplary laser processing system for implementing a laser drilling process.

At the end of the incubation period, the irradiated region of the substrate (e.g., which may be at or near the second surface of the substrate, at or near the first surface of the substrate, or a combination thereof) has accumulated a sufficient amount of heat to locally increase temperature of the substrate and reduce the band gap energy thereof, enabling a transition to a regime in which the irradiated region of the substrate can melt and, eventually, evaporate. It is suspected that the bandgap of the substrate material decreases as a result of thermal ionization, i.e. the gradual overlay of the bandgap at high temperatures by electronic and vibrational states of molecules. It is possible that impact ionization and cascade ionization within the high-temperature region of the substrate may also occur, which can lead to an increase in carrier density that could also contribute to enhanced laser absorption therein. The region of the substrate that becomes melted during the laser-drilling process can be characterized as a "melt zone." The significant increase in the absorptivity of the laser pulses at the edge or boundary or interface of the high-temperature region within the substrate quickly causes the melt zone to progressively grow toward the first surface (i.e., in a direction opposite to the propagation direction of the beam of laser pulses from the scan lens 110). In addition, at extremely high temperatures (i.e., at temperatures greater than 3000)° ° C. within the substrate, it has been showed that impact ionization and cascade ionization may also be seeded by thermally-ionized free-electrons without the contributions of multi-photon absorption, causing a significant increase in the absorption of laser pulses. Increasing the temperature in the melt zone in excess of the vaporization/boiling point of the substrate material will eventually generate large vapor pressures that may push the melted substrate material out of the via (i.e., at least mainly through the second surface) to create the through-via. Accordingly, the focused beam of laser pulses can remain at the irradiated region of the substrate for an additional period of time (e.g., also referred to herein as a "removal period") immediately after the incubation period to heat, melt and evaporate the irradiated region of the substrate (i.e., through the entire thickness of the substrate) to form a through-via. The total period of time from the beginning of the incubation period to the end of the removal period is herein referred to as the "drilling period."

In view of the above, it should be apparent that the laser drilling process described herein is highly dependent upon the heat accumulation dynamics of the substrate (i.e., upon being irradiated by the focused beam of laser pulses). Accordingly, the beam of laser pulses can be generated and focused in any manner known in the art to produce a focused beam of laser pulses, wherein each laser pulse in the focused beam of laser pulses has a peak power and peak optical intensity at the substrate sufficient to heat (but not to ablate, crack, or otherwise damage) the substrate. The beam of laser pulses is further generated, in any manner known in the art, to produce laser pulses having the sufficient peak power at a pulse repetition rate sufficient to prevent the substrate from substantially cooling between laser pulses (e.g., to enable the substrate to accumulate heat during the incubation period, and continue to accumulate heat during the removal period, as discussed above). However, the peak power, peak optical intensity and pulse repetition rate of the focused beam of laser pulses should also be selected to prevent the substrate from accumulating heat too quickly, which can result in undesirable phenomena such as cracking in regions of the substrate that are not irradiated by the beam of laser pulses and ejection of molten material over an undesirably large area on the exterior of the substrate.

In one embodiment, the beam of laser pulses, as generated, focused and delivered to the substrate to implement the laser drilling process described herein, can be characterized as having a pulse repetition rate of 30 MHz and a peak power at the substrate (e.g., as determined by pulse energy and pulse width, as is known in the art) of about 78 KW to irradiate the substrate at a peak optical intensity (e.g., as determined by peak power and spot size at the substrate, as is known in the art) of $1.27 \cdot 10^{11}$ W/cm² (or thereabout). It should be recognized that the beam of laser pulses may have a pulse repetition rate greater than or less than 30 MHZ, and that the peak power of the beam of laser pulses at the substrate can be maintained (e.g., by adjusting the pulse width or pulse energy of laser pulses within the beam of laser pulses) or otherwise adjusted as needed to compensate for change in pulse repetition rate. Likewise, the peak optical intensity at the substrate can, optionally, be maintained (e.g., by adjusting the pulse width, pulse energy of laser pulses within the beam of laser pulses, or spot size at the second surface of the substrate) or otherwise adjusted as needed to compensate for change in pulse repetition rate. During the drilling period, the pulse repetition rate, peak power, pulse width, or pulse energy of laser pulses within the beam of laser pulses may be constant or variable. Generally, lasers operative to generate a beam of laser pulses having sufficiently high pulse repetition frequencies and peak powers with which the laser drilling process can be implemented are QCW lasers capable of generating laser pulses having a pulse widths in a range from 200 fs (or thereabout) to 50 ps (or thereabout). For example, the laser pulses can have a pulse width of 200*fs*, 400*fs*, 800*fs*, 1 ps, 2 ps, 5 ps, 10 ps, 20 ps, 25 ps, 30 ps, 40 ps, 45 ps, 50 ps, etc., or any between any of these values.

Accordingly, to implement the laser drilling process described herein, the pulse repetition rate of the beam of laser pulses can be in a range from 5 MHZ (or thereabout) to 5 GHZ (or thereabout), provided that the peak power of the beam of laser pulses and, optionally, the peak optical intensity at the substrate, are adjusted as needed to compensate for change in pulse repetition rate. In one embodiment, the pulse repetition rate can be in a range from 5 MHZ (or thereabout) to 500 MHZ (or thereabout). In other embodiments, the pulse repetition rate can be in a range from 25 MHZ (or thereabout) to 40 MHZ (or thereabout), in a range from 150 MHZ (or thereabout) to 180 MHZ (or thereabout).

Depending upon one or more factors such as the thickness of the substrate, pulse repetition rate of the beam of laser pulses, pulse energy of laser pulses in the beam of laser pulses, pulse width of laser pulses in the beam of laser pulses, peak power at the substrate, optical intensity at the substrate, the drilling period can be in a range from 5 μs (or thereabout) to 120 μs (or thereabout). In some embodiments, the drilling period can advantageously be less than or equal to 50 μs (or thereabout), less than or equal to 30 μs (or thereabout), less than or equal to 20 μs (or thereabout), less than or equal to 15 μs (or thereabout), less than or equal to 10 μs (or thereabout), etc., or between any of these values.

When the beam waist of the focused beam of laser pulses is outside the substrate, near the second surface, absorption of the laser energy happens at the interface of the second surface of the substrate and the ambient environment (i.e., air). This interface helps to lower the ablation threshold to start coupling laser energy in the beam of laser pulses into the substrate. The relatively high peak intensity helps to eliminate the need for an absorptive coating at the second surface of the substrate. From experiments performed by the inventors, there seems to be an initial incubation period where the focused beam of laser pulses doesn't damage the substrate.

In some embodiments, the first surface of the substrate is cleaned to remove (or reduce the amount of) contaminants on the first surface that would absorb energy within the beam of laser pulses. In experiments performed by the inventors, it has been discovered that, when the beam of laser energy is transmitted through a portion of the first surface that has not been cleaned, any through-vias that are formed within the substrate tend to have a relatively large opening at the first surface and a relatively small opening at the second surface. When the beam of laser energy is transmitted through a portion of the first surface that has been suitably cleaned, any through-vias that are formed within the substrate tend to have openings at the first surface and the second surface that are about the same diameter (e.g., within a range of 2 μm to 5 μm of each other).

Removal of material from the substrate during the laser drilling process thus appears to involve a combination of melting and ablation of the substrate material, and the material removal rate has been surprisingly high compared to conventional laser drilling processes despite the fact that the beam of laser pulses has a relatively low average power. Indeed, the laser drilling process described herein provides a significant improvement in via-formation rate compared to conventional laser drilling processes. Experiments conducted by the inventors on optically-transparent glass substrates ~100 μm thick (i.e., performing the laser drilling process described herein according to a percussion drilling technique) indicate that through-vias having a diameter of about 10 μm can be reliably formed in 15 μs (or thereabout). Experiments conducted by the inventors on optically-transparent glass substrates ~50 μm thick (i.e., performing the laser drilling process described herein according to a percussion drilling technique) indicate that through-vias having a diameter of about 10 μm can be formed in only 5 μs (or thereabout) and can be reliably formed in 15 μs (or thereabout). In contrast to the laser drilling process in the embodiments described herein, conventional laser drilling processes in optically-transparent glass substrates using laser pulses having pulse widths less than 10 picoseconds at transparent wavelengths rely on non-linear absorption, and the time required to form one through-via tends to be a couple of magnitudes slower than the time required to form one through-via according to the laser drilling process described herein.

FIG. 1 illustrates an exemplary laser processing system for implementing the laser drilling process described in the embodiments above. Referring to FIG. 1, the laser processing system 100 includes a laser 102, a beam expander 104, a beam modulator 106, a beam scanner 108, a scan lens 110 and a stage 112.

The laser 102 can be provided as any suitable laser capable of generating the (e.g., a QCW laser capable of generating a beam of laser pulses having the characteristics noted above. For example, the laser 102 may be configured to generate a beam of laser pulses at an average power of 100 W (or thereabout), a wavelength of 515 nm (or thereabout, e.g., 532 nm), a pulse width in a range from 20 ps (or thereabout) to 40 ps (or thereabout) and a pulse repetition rate in a range from 25 MHz (or thereabout) to 40 MHz (or thereabout). In one embodiment, the pulse width of the laser pulses is 28 ps (or thereabout), and the pulse repetition rate is 30 MHZ (or thereabout).

The beam expander 104 can be provided as any suitable device capable of expanding an incident beam from a first beam size (e.g., a diameter of 2 mm, or thereabout) to a second beam size (e.g., a diameter of 4.5 mm, or thereabout). In one embodiment, the beam expander may be provided as a motorized variable beam expander.

The beam modulator 106 can be provided as any suitable device capable of selectively attenuating (e.g., either partially, completely or not at all) the beam of laser an energy. In one embodiment, the beam modulator 106 can be provided as an acousto-optic (AO) modulator (AOM) or an AO deflector (AOD).

The beam scanner 108 can be provided as any suitable device (or devices) capable of deflecting an incident beam of laser pulses (e.g., within a one-dimensional scan field, within a two-dimensional scan field, etc.). Accordingly, the beam scanner 108 can include one or more galvanometer mirrors, one or more fast-steering mirrors, one or more deformable mirrors, one or more AODs, a rotating polygon mirror, or the like or any combination thereof.

The scan lens 110 can be provided as any suitable device (or devices) capable of focusing an incident beam of laser pulses so as to produce a focused beam of laser pulses. In one embodiment, the scan lens 110 is provided as a telecentric scan lens. In another embodiment, the scan lens 110 has a focal length of 100 mm (or thereabout) and a numerical aperture (NA) of about 0.5 or less. In one embodiment, the scan lens 110 can be focus the beam of laser pulses to produce a beam waist (e.g., at the focal plane of the scan lens 110) that has a diameter in a range from 10 μm (or thereabout) to 13 μm (or thereabout), e.g., in a range from 11 μm to 12 μm.

The stage 112 can be provided as any suitable device (or devices) capable of supporting and moving the aforementioned substrate (e.g., identified at 114). In one embodiment, the stage 112 is configured to linearly move the substrate 114 along one axis, along two axes, or the like or any combination thereof. Generally, the substrate 114 can be characterized as including a first surface (e.g., which faces towards the scan lens 110) and a second surface, opposite the first surface (e.g., which faces away from the scan lens 110). The stage 112 is configured to support the substrate 114 such that the second surface of the substrate 114 does not contact an underlying structure, such as the stage 112. As used herein, the first surface of the substrate 114 is also referred to as the "front surface" of the substrate 114 and the second surface of the substrate 114 is also referred to as the "back surface" of the substrate 114.

In one embodiment, the stage 112 supports the substrate 114 such that the focal plane of the scan lens 110 is located outside the substrate 114 (i.e., below the second surface of the substrate 114). The distance between the second surface of the substrate 114 and the focal plane of the scan lens 110 (i.e., the aforementioned "offset distance") is set such that the focused beam of laser pulses irradiates a region of the substrate at a peak intensity that is less than the optical breakdown intensity of the substrate, while still producing a through-via in the substrate, as discussed above. It will be appreciated that the offset distance may be determined experimentally or may be calculated (e.g., based on the parameters of the laser drilling process, based on the material of the substrate, or the like or any combination thereof).

The system 100 may further include one or more other components to polarize, reflect, expand, focus, etc., the beam of laser pulses propagating from the laser 102 to the scan lens 110 (e.g., along the dashed lines, as exemplarily illustrated in FIG. 1). Examples of such components include a half-wave plate 116, a pair of relay lenses 118, and a plurality of fold-mirrors (e.g., fold mirror 120). In one embodiment, the pair of relay lenses are arranged and configured to magnify the beam of laser pulses as output from the beam modulator 106 (e.g., double the beam size of the beam of laser pulses as output from the beam modulator 106). Accordingly, if the beam of laser pulses as output from the beam modulator 106 had the aforementioned second beam size of 4.5 mm (or thereabout), then the beam of laser pulses output from the pair of relay lenses can be characterized as having a third beam size of 9 mm (or thereabout).

Figure 2:
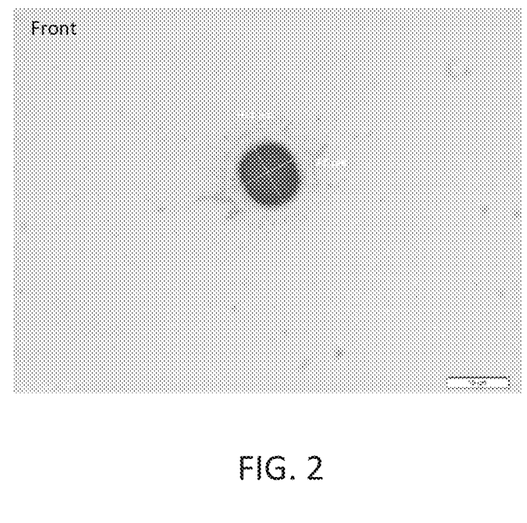
FIGS. 2 and 3 are photographs illustrating a through-via drilled through an exemplary glass substrate using a laser drilling process according to one embodiment.
Figure 3:
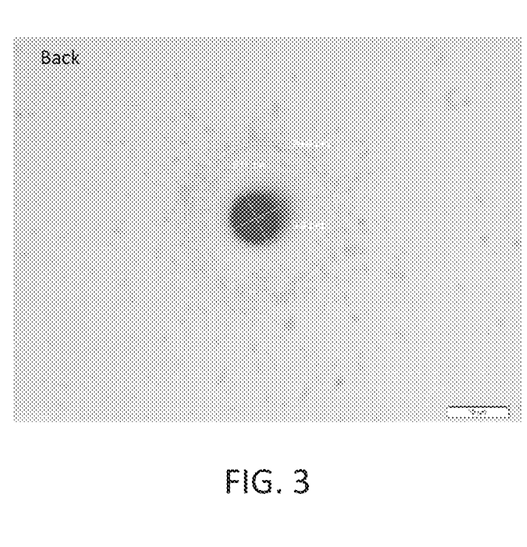

FIGS. 2 and 3 are photographs illustrating a through-via drilled through a 50 μm thick glass substrate (i.e., a substrate formed of AF 32®, manufactured by SCHOTT Corporation), taken from the first and second surfaces of the glass substrate, respectively, using the aforementioned laser processing system 100 and implementing the laser drilling process described above. The glass substrate was uncoated, in that it did not have any absorptive coating formed on either surface, and the average power of the beam of laser pulses at the substrate (i.e., after having been reflected, transmitted, or diffracted by the aforementioned components of the laser processing system 100) was in a range from 66 W (or thereabout) to 67 W (or thereabout). The diameter of the through-via at the first surface (as shown in FIG. 2) was in a range from 9.5 μm to 10.1 μm; and the diameter of the through-via at the second surface (as shown in FIG. 3) was 9 μm.

Figure 4:
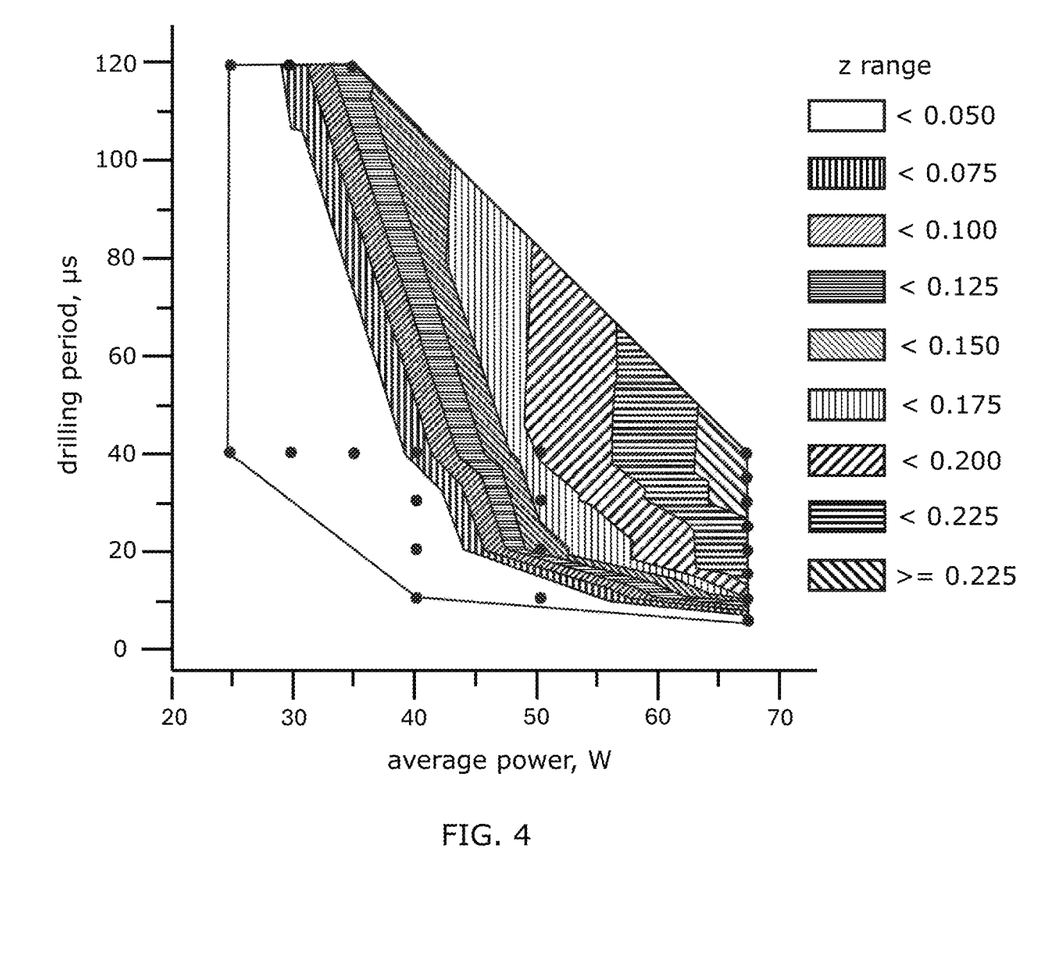
FIG. 4 is a graph illustrating the results of experiments in which a glass substrate was subjected to laser drilling processes according to some embodiments.
Figure 5:
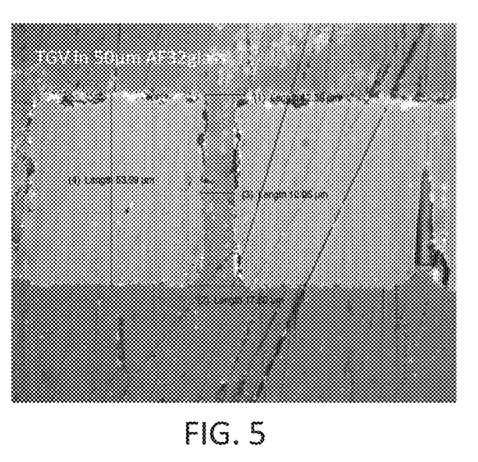
FIGS. 5 to 8 are photographs of cross-sectioned glass substrates that were processed to form though-vias according to embodiments discussed herein.
Figure 6:
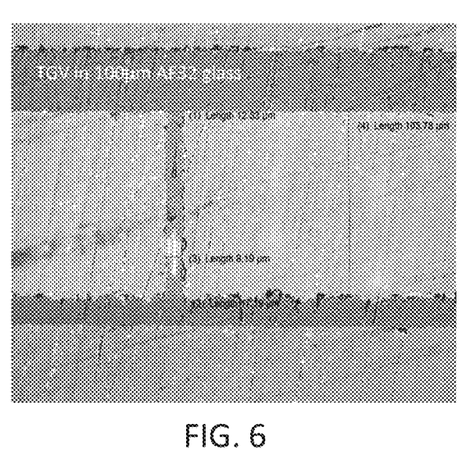
Figure 7:
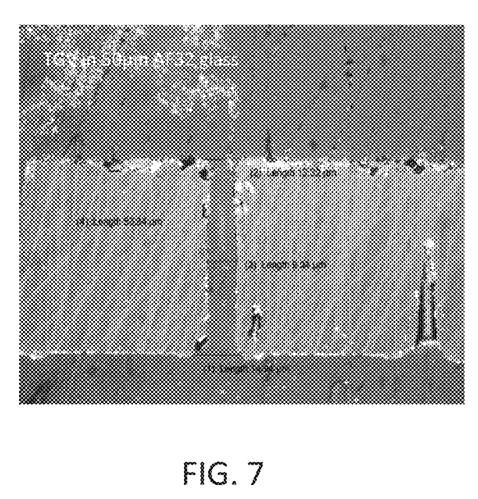
Figure 8:
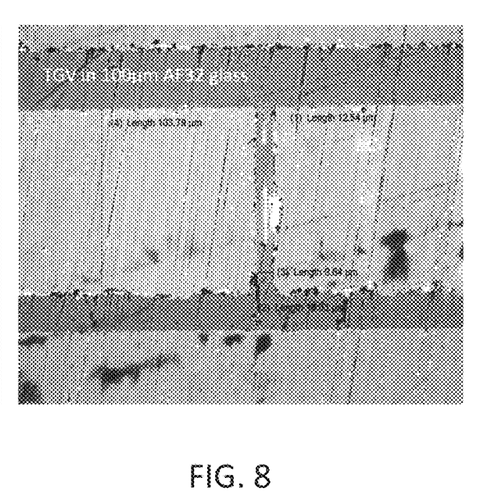

FIG. 4 is a graph illustrating the results of experiments in which a 50 μm thick glass substrate (i.e., an uncoated substrate formed of AF 32®, manufactured by SCHOTT Corporation) was subjected to the laser drilling process described above. In the experiments, the average power of the beam of laser pulses at the substrate was varied from 25 W (or thereabout) to 67 W (or thereabout) and the drilling period at each location in the substrate where an attempt to form a via was made was varied from 5 μs to 120 μs in 5 μs intervals. The dots in the graph represent actual data points obtained from each experiment, and the boundaries of the contours were derived from the experimentally-obtained data using the statistical analysis software JPM, produced by SAS INSTITUTE, INC.

As shown in FIG. 4, experiments performed by the inventors indicated that, at an average power of 25 W and drilling period of 120 μs, the laser drilling process did not damage the substrate at all and, hence, did not form any through-vias. Likewise at average power/drilling period pairings of 25 W/40 μs, 30 W/40 μs, 35 W/40 μs, 40 W/30 μs, 40 W/20 μs, 40 W/10 μs, 50 W/10 μs. At an average power of 67 W and drilling period of 5 μs, through-vias were formed in the substrate when the z offset was 0.05 mm, but no through-vias were formed at z offsets greater than 0.05 mm. Thus, at an average power of 66 W (or thereabout) to 67 W (or thereabout) and drilling period of 5 μs, the z range of the laser drilling process is 0.05 mm. The z range of the laser drilling process was found to be capable of expansion, as illustrated in FIG. 4, by increasing the average power at the substrate and/or by increasing the drilling period at each drilling location. For example, by increasing the drilling period from 40 μs to 120 μs (at an average power of 30 W), through-vias can be formed at a z offset of 0.075 mm. Likewise, at an average power of 40 W and drilling period of 40 μs, through-vias were formed in the substrate when the z offset was 0.075 mm (but no through-vias were formed at z offsets greater than 0.075 mm). Importantly, it has been discovered that, when the average power at the workpiece is in a range from 66 W (or thereabout) to 67 W (or thereabout), through-vias formed at a drilling period of 15 μs can be formed at a z offset of at least 0.2 mm (or thereabout). Thus, at an average power of 66 W (or thereabout) to 67 W (or thereabout) and drilling period of 15 μs, the z range of the laser drilling process is greater than 0.2 mm. In many cases, this z range desirably accommodates for variations in substrate thickness or flatness, thus ensuring that through-vias can be rapidly and reliably formed through the substrate.

FIGS. 5 to 8 are photographs of cross-sectioned glass substrates (i.e., formed of AF 32®, manufactured by SCHOTT Corporation), that are either 50 μm thick (in the case of FIGS. 5 and 7) or 100 μm thick (in the case of FIGS. 6 and 8) that were processed (e.g., using the laser processing system 100 and the laser drilling process described above) to form though-vias, wherein each via is formed for a drilling period of 15 μs. The glass substrates did not have any absorptive coating formed on either surface, and the average power of the beam of laser pulses at the substrate (i.e., after having been reflected, transmitted, or diffracted by the aforementioned components of the laser processing system 100) was in a range from 67 W (or thereabout) to 69 W (or thereabout). In FIGS. 5 to 8, the ragged edge quality at the cross-sectioned plane is due to the fragility of glass material to the mechanical grinding method used to cross-section the substrate. Thus, the diameters identified in FIGS. 5 to 8 may have been smaller than those annotated thereon, prior to cross-sectioning. The main objective of FIGS. 5 to 8 is to illustrate how straight the sidewalls of the through-vias are, and the uniformity of the diameter of the through-vias through the entire thickness of the substrate.

From the foregoing, it will be appreciated that the beam of laser pulses can be scanned (e.g., by the beam scanner 108) to form a plurality of through-vias. In the laser drilling process described herein, the minimum via-to-via pitch (i.e., the distance between nearest-neighbor vias) will generally be limited by the diameter of the "splash zone" around the opening of each through-via at the second surface of the substrate. Generally, the splash zone is a zone around the opening at the second surface where molten material is ejected from the substrate during formation of a through-via. In some embodiments, the laser drilling process described above yields a splash zone having a diameter of about 30 μm. Thus, the via-to-via pitch can be at least 30 μm (or thereabout).

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention.

For example, although through-vias having openings with a diameter of about 10 μm at the first surface and second surface of substrates having a thickness of either 50 μm or 100 μm have been described, it will be appreciated that through-vias having similarly-sized openings may be formed in substrates having a thickness that is less than 50 μm, between 50 μm and 100 μm, or greater than 100 μm. Moreover, through-vias having openings at the first and second surfaces with a smaller diameter may be obtained by using a scan lens 110 with an NA higher than 0.5.

In another example, although the laser system 100 has been described above as including a laser 102 operative to generate a beam of laser pulses at a wavelength of 515 nm (or thereabout), it will be appreciated that the laser drilling process described in the embodiments above can be achieved using laser pulses at wavelengths other than 515 nm (or thereabout), depending on one or more other factors such as the average power at the substrate, pulse width, pulse repetition rate, the material from which the substrate is formed and the like. For example, the aforementioned laser drilling process can be performed using a beam of laser pulses at wavelengths in the near-infrared region of the electromagnetic spectrum (e.g., at 1030 nm, at 1064 nm, or the like), provided that the beam of laser pulses has a pulse repetition rate as discussed above, and also provided that the average power of the beam of laser pulses at the substrate is 100 W (or thereabout) or greater (e.g., 110 W. 120 W, 130 W, or the like or between any of these values). At wavelengths in the near-infrared region, laser pulses in the beam of laser pulses can have pulse widths as discussed above. However, it should be noted that the selection of the pulse width can affect the duration of the drilling period. Generally it has been found that, at a given average power and pulse repetition rate, a beam of laser pulses having a relatively short pulse width (e.g., 10 ps, or thereabout) will be able to form a through-via within a drilling period that is shorter than a beam of laser pulses having a relatively long pulse width (e.g., 30 ps, or thereabout).

In another example, although the laser-drilling process has been described above as eliminating need for an absorptive coating at the second surface of the substrate, it will be appreciated that the second surface of the substrate may be coated or otherwise treated with a material that is either more absorptive to the beam of laser pulses than the substrate or alters the absorptivity of the substrate (e.g., at or near the second surface thereof) to the laser pulses.

In another example, the substrate may optionally be subjected to a thermal annealing process after the laser-drilling process has been performed to form the through-vias. In this case, the thermal annealing may act to reduce internal stresses present with the substrate due to the solidification of molten material ejected into the splash zone during the laser-drilling process.

Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A method for forming a through-via in a substrate, the method comprising:
    providing a substrate having a first surface and a second surface opposite the first surface; and
    directing, during a drilling period less having a duration less than 100 μs, a focused beam of laser pulses into the substrate at a location through the first surface of the substrate and, subsequently, through the second surface of the substrate,
    wherein the focused beam of laser pulses has a wavelength to which the substrate is at least substantially transparent,
    wherein an optical intensity of the focused beam of laser pulses at the substrate is less than an optical breakdown intensity of the substrate,
    wherein the focused beam of laser pulses has a Gaussian energy distribution,
    wherein the focused beam of laser pulses has a pulse repetition rate greater than 5 MHz, and
    wherein laser pulses within the focused beam of laser pulses have a pulse width greater than 200 fs.

2. The method of claim 1, wherein the substrate is at least substantially transparent to at least one wavelength in the ultraviolet, visible or infrared regions of the electromagnetic spectrum.

3. The method of claim 2, wherein the substrate is at least substantially transparent to at least one wavelength in the visible region of the electromagnetic spectrum.

4. The method of claim 2, wherein the substrate is at least substantially transparent to at least one wavelength in the infrared region of the electromagnetic spectrum.

5. The method of claim 1, wherein the substrate is glass.

6. The method of claim 1, wherein the substrate is sapphire.

7. The method of claim 1, wherein the substrate is a silicon die.

8. The method of claim 1, wherein the substrate is a GaN die.

9. The method of claim 1, wherein the focused beam of laser pulses has a pulse repetition rate greater than 25 MHz.

10. The method of claim 9, wherein the focused beam of laser pulses has a pulse repetition rate greater than 40 MHz.

11. The method of claim 10, wherein the focused beam of laser pulses has a pulse repetition rate greater than 300 MHz.

12. The method of claim 11, wherein the focused beam of laser pulses has a pulse repetition rate greater than 500 MHz.

13. The method of claim 10, wherein laser pulses within the focused beam of laser pulses have a pulse width less than 50 ps.

14. A method for forming a through-via in a substrate, the method comprising:
    providing a substrate having a thickness in a range from 30 μm to 150 μm and having a first surface and a second surface opposite the first surface; and
    directing a focused beam of laser pulses into the substrate through the first surface of the substrate and, subsequently, through the second surface of the substrate,
    wherein the focused beam of laser pulses has a wavelength to which the substrate is at least substantially transparent;
    wherein an optical intensity of the focused beam of laser pulses at the substrate is less than an optical breakdown intensity of the substrate;
    wherein the focused beam of laser pulses has a Gaussian energy distribution;
    wherein the focused beam of laser pulses has a pulse repetition rate, a peak optical intensity at the substrate and an average power at the substrate driving a cumulative heating effect to melt a region of the substrate irradiated by the focused beam of laser pulses; and
    wherein laser pulses within the focused beam of laser pulses have a pulse width,
    wherein the peak optical intensity, pulse repetition rate, average power and pulse width are selected such that the through-via is formed in less than 40 μs.

15. The method of claim 14, wherein the peak optical intensity, pulse repetition rate, average power and pulse width are selected such that the through-via is formed in less than 30 μs.

16. The method of claim 15, wherein the peak optical intensity, pulse repetition rate, average power and pulse width are selected such that the through-via is formed in less than 20 µs.

17. The method of claim 16, wherein the peak optical intensity, pulse repetition rate, average power and pulse width are selected such that the through-via is formed in less than 10 µs.

18. The method of claim 15, wherein the peak optical intensity, pulse repetition rate, average power and pulse width are selected such that the through-via is formed in a range from 5 µs to 15 µs.

19. A method for forming a through-via in a substrate, the method comprising:
   providing a substrate having a first surface and a second surface opposite the first surface; and
   directing a focused beam of laser pulses into the substrate through the first surface of the substrate and, subsequently, through the second surface of the substrate,
   wherein the focused beam of laser pulses has a wavelength to which the substrate is at least substantially transparent and wherein a beam waist of the focused beam of laser pulses is located within the substrate closer to the second surface of the substrate than to the first surface of the substrate, and
   wherein the focused beam of laser pulses is characterized by a pulse repetition rate, a peak optical intensity at the substrate and an average power at the substrate sufficient to:
      melt a region of the substrate near the second surface, thereby creating a melt zone within the substrate;
      propagate the melt zone toward the first surface; and
      vaporize or boil material of the substrate located within the melt zone.

* * * * *